(12) United States Patent
Jetté et al.

(10) Patent No.: US 11,667,030 B2
(45) Date of Patent: Jun. 6, 2023

(54) MACHINING STATION, WORKPIECE HOLDING SYSTEM, AND METHOD OF MACHINING A WORKPIECE

(71) Applicant: FIVES LINÉ MACHINES INC., Granby (CA)

(72) Inventors: Louis Jetté, St-Étienne de Bolton (CA); Raymond Chabot, St-Alphonse de Granby (CA)

(73) Assignee: FIVES LINE MACHINES INC., Granev (CA)

( * ) Notice: Subject to any disclaimer, the term of this patent is extended or adjusted under 35 U.S.C. 154(b) by 185 days.

(21) Appl. No.: 17/323,520

(22) Filed: May 18, 2021

(65) Prior Publication Data

US 2021/0276178 A1    Sep. 9, 2021

Related U.S. Application Data

(63) Continuation of application No. 16/326,267, filed as application No. PCT/CA2017/051052 on Sep. 8, 2017, now Pat. No. 11,052,536.
(Continued)

(51) Int. Cl.
*B25J 9/00* (2006.01)
*B25J 15/06* (2006.01)
(Continued)

(52) U.S. Cl.
CPC ............ *B25J 9/0084* (2013.01); *B23Q 1/035* (2013.01); *B23Q 1/5462* (2013.01); *B23Q 1/58* (2013.01);
(Continued)

(58) Field of Classification Search
CPC .... B25J 15/0683; B25J 9/1682; B25J 9/0009; B25J 15/0616; B25J 11/005;
(Continued)

(56) References Cited

U.S. PATENT DOCUMENTS 6,099,217 A * 8/2000 Wiegand ................ B23Q 17/22
901/41
9,149,932 B2 * 10/2015 Kamiya ................. B25J 9/1676
(Continued)

FOREIGN PATENT DOCUMENTS

| EP | 1223002 A2 | 7/2002 |
|----|------------|--------|
| WO | 2005118217 A1 | 12/2005 |

OTHER PUBLICATIONS

Andres et al., Inverse kinematics of a redundant manipulator for cam integration. An industrial perspective of implementation, 2009, IEEE, p. 1-6 (Year: 2009).*
(Continued)

*Primary Examiner* — McDieunel Marc
(74) *Attorney, Agent, or Firm* — Alexandre Daoust; Norton Rose Fulbright LLP

(57) ABSTRACT

The machining station can include a table; at least three robots each having a multi-axis mover secured to the table, and a gripper opposite the table, the robots being interspaced from one another on the table; and a controller. The controller controls the robots to hold a workpiece in a coordinated manner. The computer numerical command (CNC) machine-tool system machines the workpiece while the workpiece is held by the robots. The workpiece can be moved into and out from the machining station with a trolley which slidingly engages a trolley path formed within the table.

20 Claims, 9 Drawing Sheets

Related U.S. Application Data

(60) Provisional application No. 62/384,869, filed on Sep. 8, 2016.

(51) Int. Cl.

| | | |
|---|---|---|
| *B23Q 1/54* | (2006.01) | |
| *G05B 19/418* | (2006.01) | |
| *B23Q 1/58* | (2006.01) | |
| *B23Q 1/03* | (2006.01) | |
| *B25J 11/00* | (2006.01) | |
| *B25J 9/16* | (2006.01) | |
| *B23Q 1/00* | (2006.01) | |
| *B23Q 11/08* | (2006.01) | |

(52) U.S. Cl.
CPC ........... *B25J 9/0009* (2013.01); *B25J 9/0069* (2013.01); *B25J 9/1682* (2013.01); *B25J 11/005* (2013.01); *B25J 11/0055* (2013.01); *B25J 15/0616* (2013.01); *B25J 15/0683* (2013.01); *G05B 19/41825* (2013.01); *B23Q 1/0045* (2013.01); *B23Q 11/0891* (2013.01); *G05B 2219/39105* (2013.01); *G05B 2219/39156* (2013.01); *G05B 2219/39157* (2013.01); *G05B 2219/45145* (2013.01); *Y02P 90/02* (2015.11)

(58) Field of Classification Search
CPC .... B25J 11/0055; B25J 9/0084; B25J 9/0069; G05B 19/41825; G05B 2219/39157; G05B 2219/45145; G05B 2219/39105; G05B 2219/39156; B23Q 1/035; B23Q 1/58; B23Q 1/037; B23Q 1/5462; B23Q 1/0045; B23Q 11/0891; Y02P 90/02
See application file for complete search history.

(56) References Cited

U.S. PATENT DOCUMENTS

| | | | |
|---|---|---|---|
| 9,333,649 B1* | 5/2016 | Bradski | ............... G06T 19/003 |
| 9,990,685 B2* | 6/2018 | Melikian | ............ H04N 5/23229 |
| 11,052,536 B2* | 7/2021 | Jetté | .................... B23Q 1/5462 |
| 11,270,717 B2* | 3/2022 | Ikeuchi | ............... B25J 11/0005 |
| 11,498,219 B2* | 11/2022 | Schnös | ............... G05B 19/4015 |
| 2004/0056400 A1 | 3/2004 | Ghuman et al. | |
| 2004/0056405 A1 | 3/2004 | Ghuman et al. | |
| 2014/0046471 A1 | 2/2014 | Bamford et al. | |
| 2014/0046486 A1 | 6/2014 | Mimura et al. | |
| 2016/0126128 A1 | 5/2016 | Bonora et al. | |
| 2020/0165762 A1 | 5/2020 | Zornow et al. | |

OTHER PUBLICATIONS

Lozano-Perez, Robot Programming, 1983, IEEE, p. 821-841 (Year: 1983).*

Birk et al., An Orienting Robot for Feeding Workpieces Stored in Bins, 1981, IEEE, p. 151-160 (Year: 1981).*

Felsch et al., Automatic reconfiguration of flexible robot gripping system, 2010, IEEE, p. 1-4 (Year: 2010).*

* cited by examiner

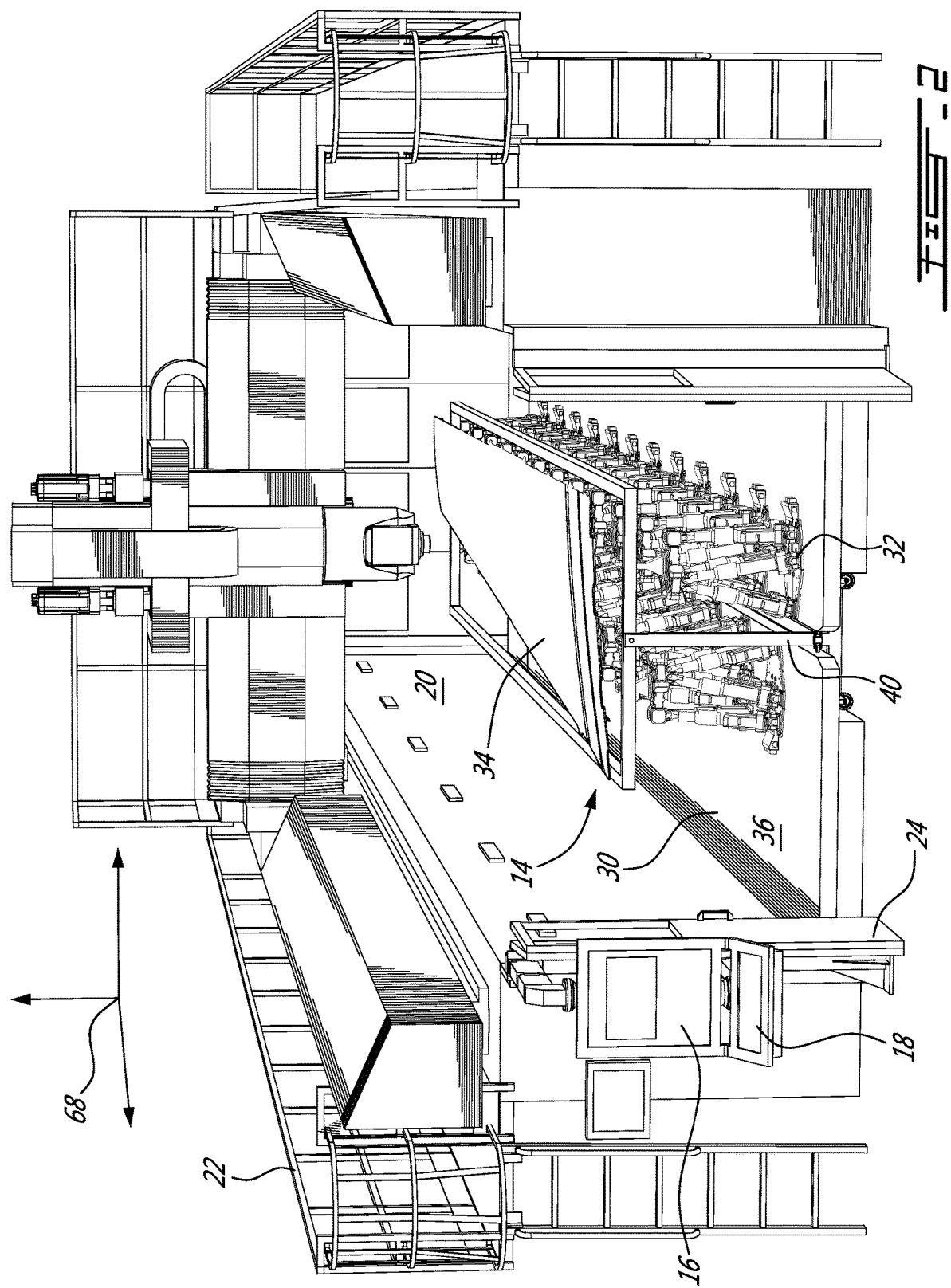

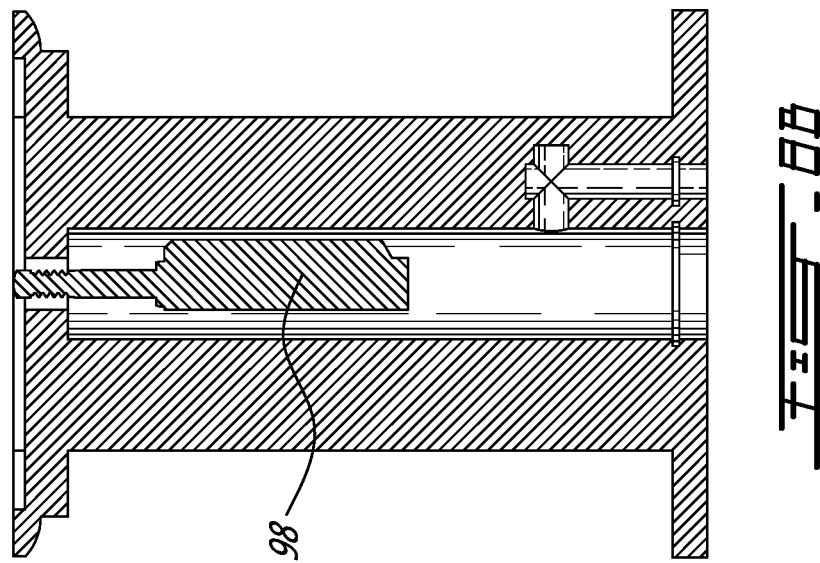
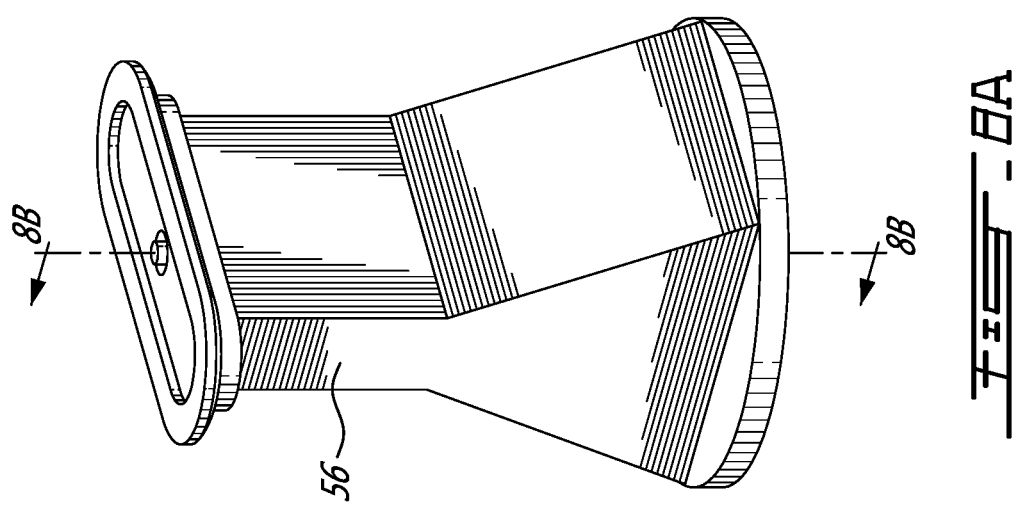

MACHINING STATION, WORKPIECE HOLDING SYSTEM, AND METHOD OF MACHINING A WORKPIECE

FIELD

The improvements generally relate to the field of machine-tools, and more specifically to a workpiece holding system for holding the workpiece during machining.

BACKGROUND

Automating machining operations is an important aspect of improving worldwide competitiveness of some manufacturing plants, and can be vital in industries such as the automobile or aerospace industries for instance.

Computer numerical control (CNC) machine-tools have been developed to this end over the last decades, and can perform multiple machining operations on a workpiece in a workstation. In some fields, machining operations must be performed within very tight dimensional tolerances. To achieve such tight dimensional tolerances, it was known to firmly secure the workpiece on a sturdy base commonly referred to as a 'table', in the workstation. The machine-tools were then moved relative to the workpiece, performing various machining tasks on the workpiece. The movement of the machine-tools was tracked, allowing precise control in a numerical reference frame of the workstation. The overall workflow of the machining station also included the handling of the workpieces before and after the milling operation, as well as the step of precisely determining the position and orientation of the workpiece in the machining station.

These known methods were very satisfactory for relatively small components. However, in some industries, there was a need to perform automated machining operations on larger components, such as aircraft wing skins or spars for instance. There thus remained room for improvement. For instance, there remained room for improvement in handling relatively large workpieces in the context of automated machining operations.

SUMMARY

There is provided a workpiece holding system for a machining station. The workpiece holding system includes three or more robots mounted on a table, and a controller adapted to control the robots in a coordinated manner to grab the workpiece and hold the workpiece firmly during the machining operation. The robots can have parallel kinematic movers, such as hexapod movers for instance, which can allow the flexibility of both moving and orienting the grippers over three axes, providing six degrees of freedom, while simultaneously providing ruggedness and stability to hold the workpiece in a given position within very tight dimensional tolerances while the machining operations, which impart forces and moments on the workpiece, are performed thereon. A handling scheme is also presented in which the workpieces are mounted to trolleys which have a shape mating with a shape of a corresponding cavity forming a trolley passage in the table, in a manner that a workpiece can be moved into the machining station manually by moving the trolley, unsecured from the trolley, grabbed by the coordinated action of the robots, positioned and held in a machining position, machined by the machine-tool system while it is held by the robots, freed from the robots, secured to the trolley, and manually removed from the machining station with the trolley in a highly productive and efficient manner.

In accordance with one aspect, there is provided a machining station comprising: a table; at least three robots each having a multi-axis mover secured to the table, and a gripper opposite the table, the robots being interspaced from one another on the table; a controller configured and adapted to control the robots to hold a workpiece in a coordinated manner, based on control data; a computer numerical command (CNC) machine-tool system operable to machine the workpiece while the workpiece is held by the plurality of robots.

In accordance with another aspect, there is provided a method of machining a workpiece in a machining station having a table, at least three robots each having a multi-axis mover secured to the table and having a gripper opposite the table, and a computer numerical command (CNC) machine-tool, the method comprising, positioning the workpiece in the machining station; controlling the robots to hold the workpiece in a coordinated manner based on control data including coordinates of the workpiece in the machining station; machining the workpiece with the CNC machine-tool while the workpiece is held by the robots; controlling the robots to free the workpiece; removing the workpiece from the machining station.

In accordance with another aspect, there is provided a workpiece holding system for holding a workpiece during machining with a CNC machine-tool, the workpiece holding system comprising: a table; at least three robots each having a multi-axis mover secured to the table, and a gripper opposite the table, the robots being interspaced from one another on the table; a controller configured and adapted to control the robots to hold a workpiece in a coordinated manner, based on control data.

It will be understood that in the context of this specification, the expression 'controller' is not intended to be interpreted in a limitative manner, and is explicitly intended to be construed as encompassing any suitable device for performing the automated functionalities which the controller is associated to. A controller can be embodied in the form of one or more circuits of solid-state components. However, in the context of this specification, a controller will more likely be provided in the form of a computer having integrated circuits. The controller can alternatively be provided in the form of a plurality of computers adapted to communicate with one another in a wired or wireless manner. It will be understood that the expressions 'computer' as used herein is not to be interpreted in a limiting manner. It is rather used in a broad sense to generally refer to the combination of some form of one or more processing units and some form of memory system accessible by the processing unit(s). A computer can be a personal computer, a smart phone, an appliance computer, etc.

It will be understood that the various functions of a controller or a computer can be performed by hardware, by software, or by a combination of both. For example, hardware can include logic gates included as part of a silicon chip of a processor. Software can be in the form of data such as computer-readable instructions stored in the memory system. With respect to a computer, a processing unit, a controller, or a processor chip, the expression "configured to" relates to the presence of hardware, software, or a combination of hardware and software which is operable to perform the associated functions.

Many further features and combinations thereof concerning the present improvements will appear to those skilled in the art following a reading of the instant disclosure.

DESCRIPTION OF THE FIGURES

In the figures,

FIG. 2 is another oblique view thereof, with a workpiece positioned therein;

FIGS. 8A and 8B are an oblique view, and a cross-sectional view taken along lines 8B-8B of FIG. 8A, respectively, of a gripper.

DETAILED DESCRIPTION

Figure 1:
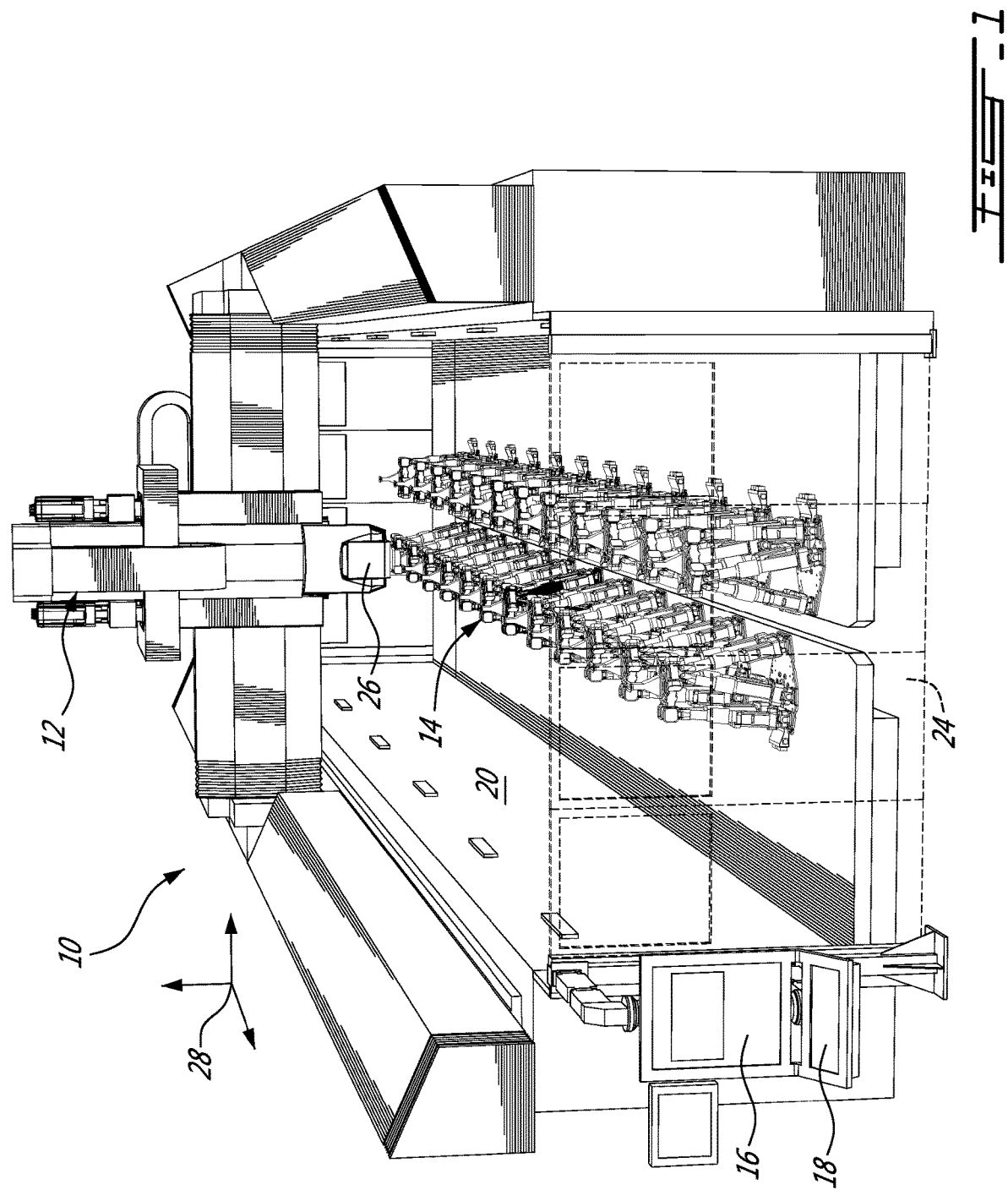
FIG. 1 is an oblique view of an example of a machining station.

FIG. 1 shows an example of a machining station 10 having a computer numerical command (CNC) machine-tool system 12 and a workpiece holding system 14. The CNC machine-tool system 12 and the workpiece holding system 14 can have individual controllers and individual user interfaces. Alternately, the controllers and/or user interfaces of the machine-tool system and of the workpiece holding system can be partially or more fully integrated to one another. In this example, a controller 16 is provided with a user interface 18 which can be used at least for the workpiece holding system 14.

In this embodiment, the machining station 10 also has a machining compartment 20 surrounded by an upper platform 22 and accessible by doors 24. The CNC machine-tool system 12 has at least one spindle 26 which can perform machining operations such as drilling, boring, chamfering or milling for instance. The spindle 26 is movable along three orthogonal axes forming a reference frame 28 and is orientable around the three orthogonal axes of the reference frame 28. The spindle thus has 6 degrees of freedom.

Figure 3A:
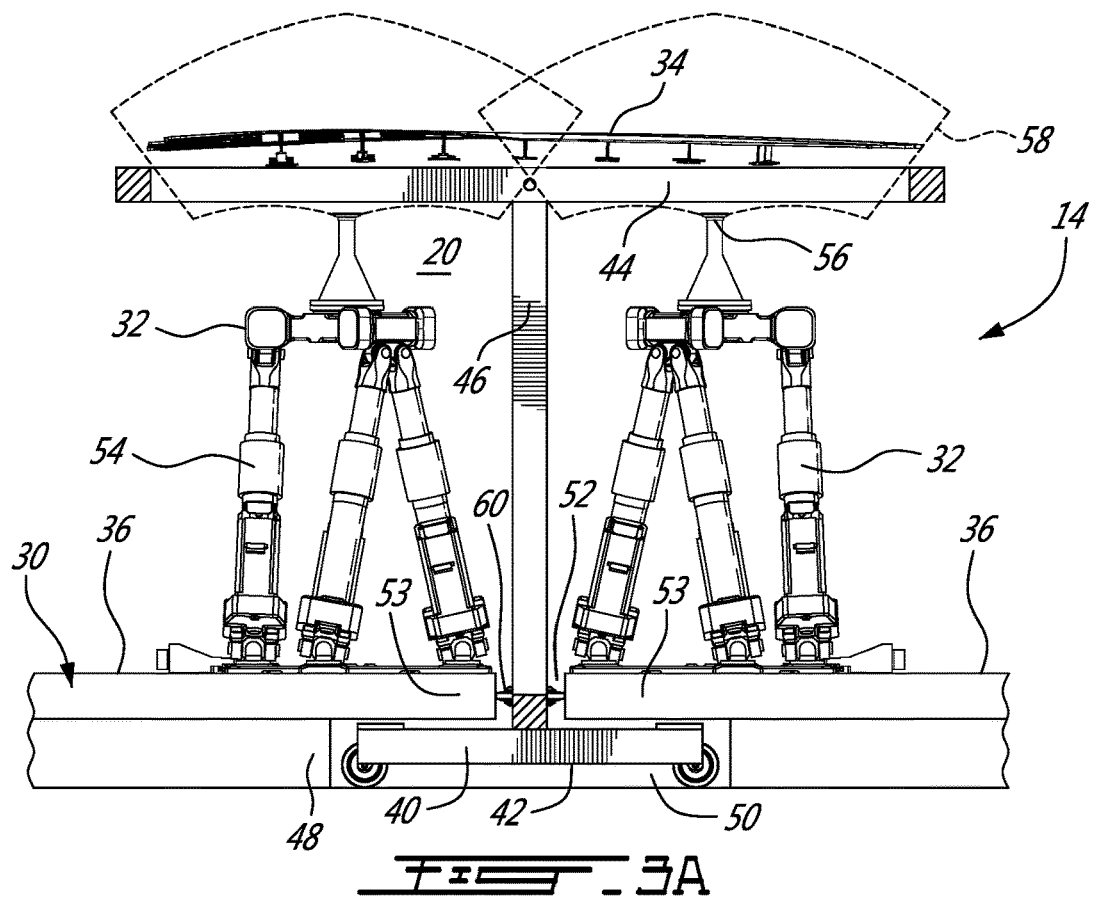
FIGS. 3A and 3B are front elevation views thereof, showing the robots disengaged, and engaged, with the workpiece, respectively.
Figure 3B:
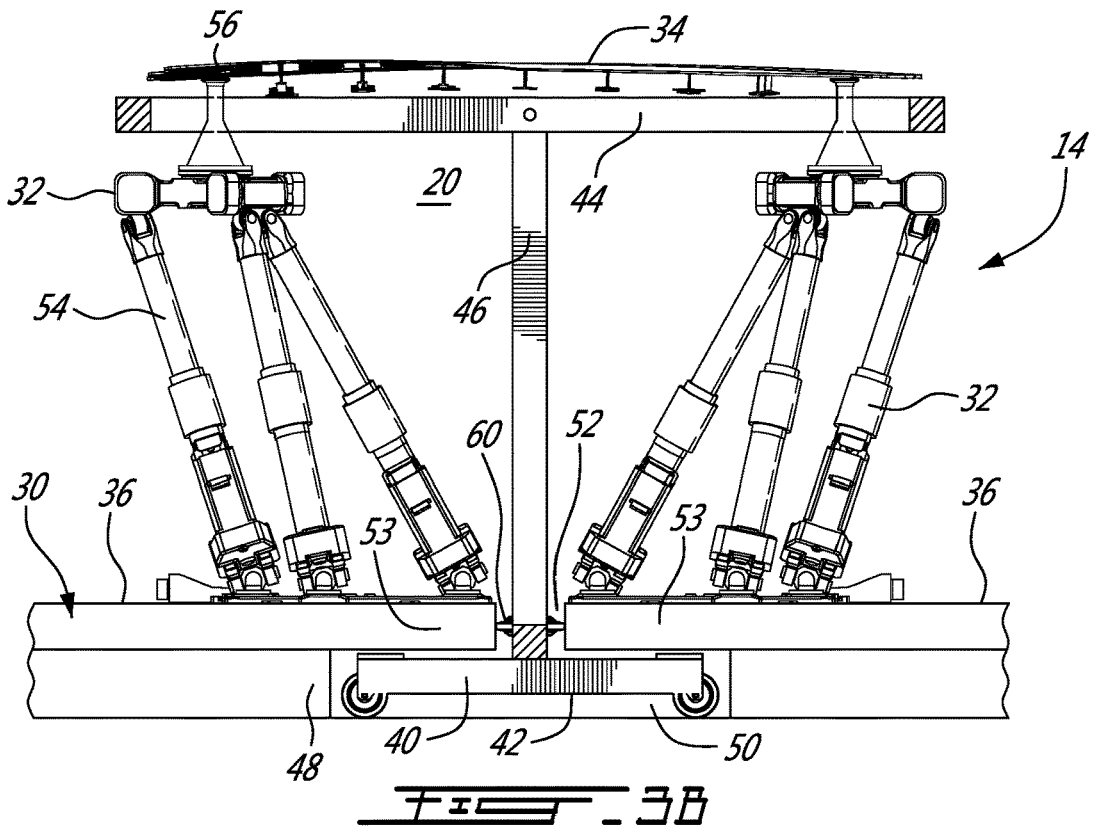

As shown more clearly in FIGS. 2, 3A and 3B, the workpiece holding system 14 has a table 30 receiving a plurality of robots 32 on a robot area of the table 30, the robots 32 being controllable in a coordinated manner to grab and move/orient a workpiece 34 located in the machining station 10. The table 30 is integrated into a platform which also has two opposite lateral alleys 36 on opposite sides of the robot area. As will be explained below, the workpiece 34 is engaged and removed from the machining compartment 20 via a trolley 40 to which it can be mounted.

Indeed, a workpiece handling scheme is provided in which the workpieces are securable to corresponding trolleys. One such trolley 40, with a workpiece 34 mounted thereon, is shown in FIGS. 2 and 3A. The trolley 40 have a wheeled base 42, an upper frame 44 to which the workpiece 34 can be removably secured, and a vertical member 46 connecting and supporting the upper frame 44 relative to the wheeled base 42. The table 30 has a cavity forming a trolley passage 48 in the shape of an elongated inverted-T with a trolley base channel 50 at the bottom and a trolley slot 52 providing a vertical opening to the cavity, such as more clearly shown in FIGS. 3A and 3B. The trolley base channel 50 has a width and height adapted to receive the wheeled base 42 of the trolley 40, and the slot 52 is shaped to receive the vertical member 46 as the trolley 40 is lengthwisely slid into the trolley passage 48. The upper frame 44 is configured to protrude above the table 30 and above the robots 32 when the trolley 40 is slid into or out from the machining compartment 20. In this embodiment, a portion of the table 30, and more specifically a portion of the robot area of the table 30, forms ledges 53 on both sides of the slot 52 which protrude over corresponding portions of the base channel 50. In this workpiece handling scheme, multiple trolleys can be used, and the additional trolleys can be used to prepare or store workpieces while a given workpiece is being machined. The trolleys can also be used to temporarily store the workpieces. In the case of relatively flat and wide workpieces, the upper frame 44 can optionally be pivotally mounted to the vertical member 46 to allow pivoting the workpiece from the horizontal orientation shown to a vertical orientation and occupy less storage volume before and after the machining operation.

In an another embodiment of the invention, the trolley 40 has two vertical frames supporting and preferably connecting on the outer edges of the upper frame 44 and relative to wheeled bases. The trolley 40 can move on the table 30. The upper frame 44 is configured to protrude above the table 30 and above the robots 32 when the trolley 40 is slid into or out from the machining compartment 20, the two vertical frames passing outside the robots 32.

As shown in FIGS. 3A and 3B, the robots 32 each have a multi-axis mover 54 secured to the table 30 and a gripper 56 opposite the table. When the trolley 40, with the workpiece 34 mounted thereon, is slid into the machining compartment 20, the robots 32 can be controlled to remain in a 'parking' configuration such as shown in FIG. 3A, in which the grippers 56 are retracted downwardly. When the workpiece 34 is in position, the robots 32 can be controlled to grab and hold the workpiece 34 by moving and operating the grippers 56. In this embodiment, the multi-axis movers 54 are hexapod movers. The hexapod movers allow movement of their respective grippers 56 along three orthogonal axes and orientation of their respective grippers 56 around three orthogonal axes, effectively providing six degrees of freedom to the grippers 56 within a given span. The movement span of the grippers 56 is illustrated in dashed lines in FIG. 3A. In the retracted, parking configuration shown in FIG. 3A, the upper frame 44 of the trolleys 40 clear the grippers 56 and the trolley 40 can be fully inserted into the machining compartment 20, with the wheeled base 42 thereof snugly engaged with the base channel 50. The robots 32 can hold the workpiece 34 through the upper frame 44 or/and on each side of the upper frame 44. That depends on the size of the upper frame 44 and on the features of the workpiece 34 to hold.

In this embodiment, lateral rollers 60 are provided on the vertical member 46 of the trolleys to snugly engage opposite lateral faces of the slot 52, providing very limited freedom of movement of the trolleys 40 in the trolley passage 48 except in the longitudinal orientation. Accordingly, if the shape and dimensions of the trolley 40 is known, and the position of the workpiece 34 on the trolley 40 is constant, with a satisfactory degree of precision, the workpiece 34 can be expected to be in a relatively precise position and orientation in the machining compartment 20 when the trolley 40 is slid down to the longitudinal end of the trolley passage 48. In this context, longitudinal refers to the length of the trolley passage. The preciseness of this positioning may be sufficient in some embodiments to activate the robots 32 to grab the workpiece 34, and could be coded as predetermined primary location data 62 (see FIG. 4) including at least partial coordinates indicative of the position of the workpiece on the trolley. The primary location data 62 can form part of control data 64 used by the controller 16 of the robots 32 to automatically engage and grab corresponding locations of the workpiece 34. The positioning could depend on the model of the workpiece 34 to be machined and a user input (e.g. scanning a bar code or entering a part number) could specify this model to the controller 16 in a manner that the controller 16 can find the correct primary location data 62 for the specific workpiece model, for instance.

However, in the illustrated embodiment, a 3D scan is used to generate an at least partial 3D model of the position and orientation of the workpiece in the machining station. This 3D model is stored in the form of primary location data 62 in a computer readable memory which is accessible by the controller 16. Artificial vision can further be provided as a component of a vision system 66 and recognize specific features of the 3D model (e.g. reference holes, flanges, bores, edges, etc.) which can be used as references to determine the areas where the grippers 56 are to engage the workpiece 34. Accordingly, the controller 16 can control the robots 32 to engage those areas by the grippers 56, in a reference system 68 of the workpiece holding system 14. The movement of the robots 32 are coordinated with the coordinates of the workpiece which are included as part of the primary location data 62. The primary location data 62 can be said to form part of control data 64, and the control data 64 can further include, for instance, data which is used to determine a path of the grippers 56 to reach the workpiece 34, for instance.

In some embodiments, the primary location data 62, or coordinates otherwise obtained by 3D scanning, may be used by the CNC machine-tool system 12 to perform the milling. However, in this embodiment where the workpieces 34 are aeronautical components requiring a relatively high degree of dimensional tolerances (small dimensional tolerances), the degree of dimensional tolerances afforded by the primary location data 62 was not sufficient to allow machining within the required dimensional tolerances. Accordingly, a secondary locating system is used in this embodiment to obtain refined coordinates of the workpiece location and orientation, in the form of refined location data 72. In this embodiment, the secondary locating system is a probe locating system 70. The probe locating system 70 can use a first set of coordinates to determine roughly where to execute the probing. This first set of coordinates can be provided in the form of the preliminary location data 62, for instance.

However, in this embodiment, it was preferred, once the workpiece 34 was grabbed by the robots 32, to use the robots 32 to move the workpiece to a predetermined milling position made accessible to the controller 16 in the form of workpiece positioning data 74. More specifically, the controller 16 can determine the difference in the position and orientation of the workpiece as indicated in the primary location data 62 vs. the workpiece positioning data 74, and control the robots 32 in a coordinated manner to move the workpiece 34 to the predetermined milling position.

The predetermined milling position can, for example, be set to be at a given distance above the upper end of the trolleys, to avoid any interference between the path of the machine-tool and the trolley. Accordingly, the trolley can be left inside the machining station during the step of machining.

The predetermined milling position can depend on the model of the workpiece 34, and a user interface 18 can be used to allow the controller 16 to select the correct workpiece positioning data 74 depending on the workpiece model. The workpiece holding system 14 can thus include, as part of the user interface 18, means to enter a part number or to scan a barcode or RFID tag, for instance, which can be referred to as an identification subsystem 76 for workpiece identification. In this embodiment, the workpiece positioning data 74 is made available to the probe locating system 70 and used by the probe locating system 70 as the first set of rough coordinates based upon which the probing routine is executed.

The probed locating system 70 provides a refined indication of the position and orientation of the workpiece in the reference system 28 of the probe locating system 70, which can be stored in the form of refined position data 72. It can even provide information of the shape of the workpiece, as, particularly in the context of large or otherwise somewhat flexible workpieces, the exact shape of the workpiece 34 may have flexed or warped relative to the theoretical shape for the workpiece model. The refined position data 72 can be made available to the CNC machine-tool system 12 to perform the machining operation on the workpiece 34 being held by the robots 32 within satisfactorily tight tolerances. Typically, the CNC machine-tool system 12 and the probe locating system 70 are precisely adjusted to be in virtually the same reference system 28. The probe locating system 70 can require the position and orientation of the part to be known within a certain tolerance (e.g. ±0.125"), prior to commencing the probing routine, which was achieved with the combination of the vision system and degree of precision afforded by robot movement (including vacuum gripper system which will be detailed below) in this specific embodiment.

Figure 5:
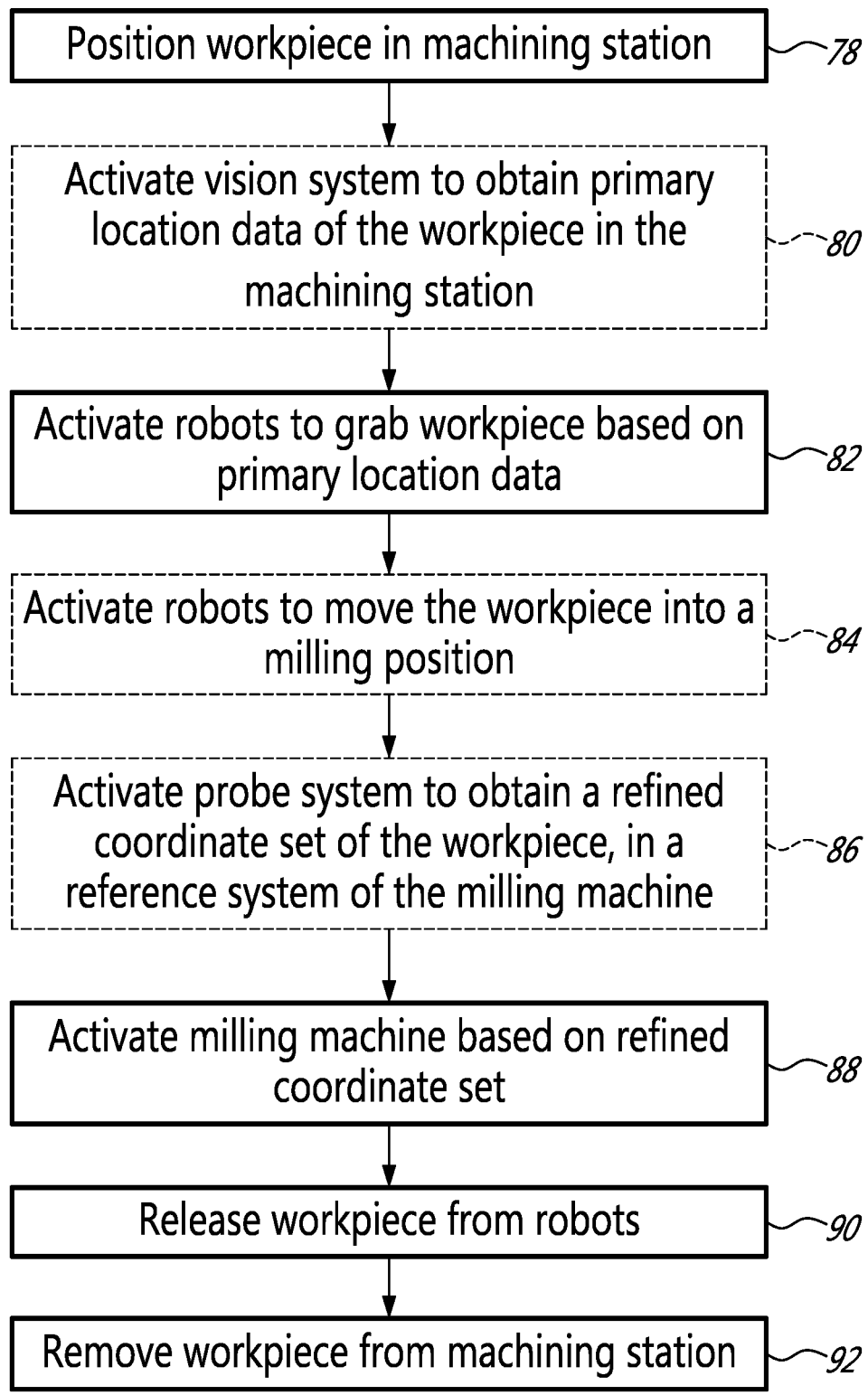
FIG. 5 is a flow chart of an example machining operation.

FIG. 5 is a flowchart illustrating the different steps for performing the machining operation. The workpiece is positioned 78 in the machining station 10, which can be performed via the trolley 40 manipulated by an operator. Indeed, as seen in FIG. 2, the trolley 40 can be engaged into the trolley passage 48 within the table 30. The vision system 66 can be activated to obtain primary location data 62, and the robots 32 can be activated 82 to grab the workpiece 34 based on this primary location data 62. The operator can then enter the machining station and walk along the alleys 36 on either side of the robot area, and unclamp the workpiece 34 from the trolley 40. The robots 32 can then be operated to move 84 the workpiece 34 to the milling position. The probe locating system 70 can be used to obtain 86 a refined coordinate set of the position, shape and orientation of the workpiece 34 in the reference system of the CNC machine-tool system 12, and the CNC machine-tool system 12 can be operated 88 to machine the workpiece 34 based on the refined set of coordinates, while the workpiece 34 is firmly held in the machining position by the robots 32. Machining data 94 can be used by the CNC machine-tool system 12 to determine a sequence of steps, and tool paths, to perform the machining sequence/operation. The robots 32 are then controlled to release 90 the workpiece 34, which can be performed after an operator has reclamped the workpiece 34 to the trolley 40 for instance (after the robots have moved the workpiece 34 back to the trolley position in the scenario where the workpiece was moved to the milling position at step 84). The workpiece 34, and its supporting trolley 40, can then be removed from the machining station 92. It will be noted that in the embodiment illustrated, the refined location data can either be used to adjust the orientation/position of the coordinates in the reference frame of the machine-tool, or can be used by the controller to move the workpiece again, and more precisely conform to the theoretical machining position, for instance, without affecting the reference frame of the machine-tool.

Figure 4:
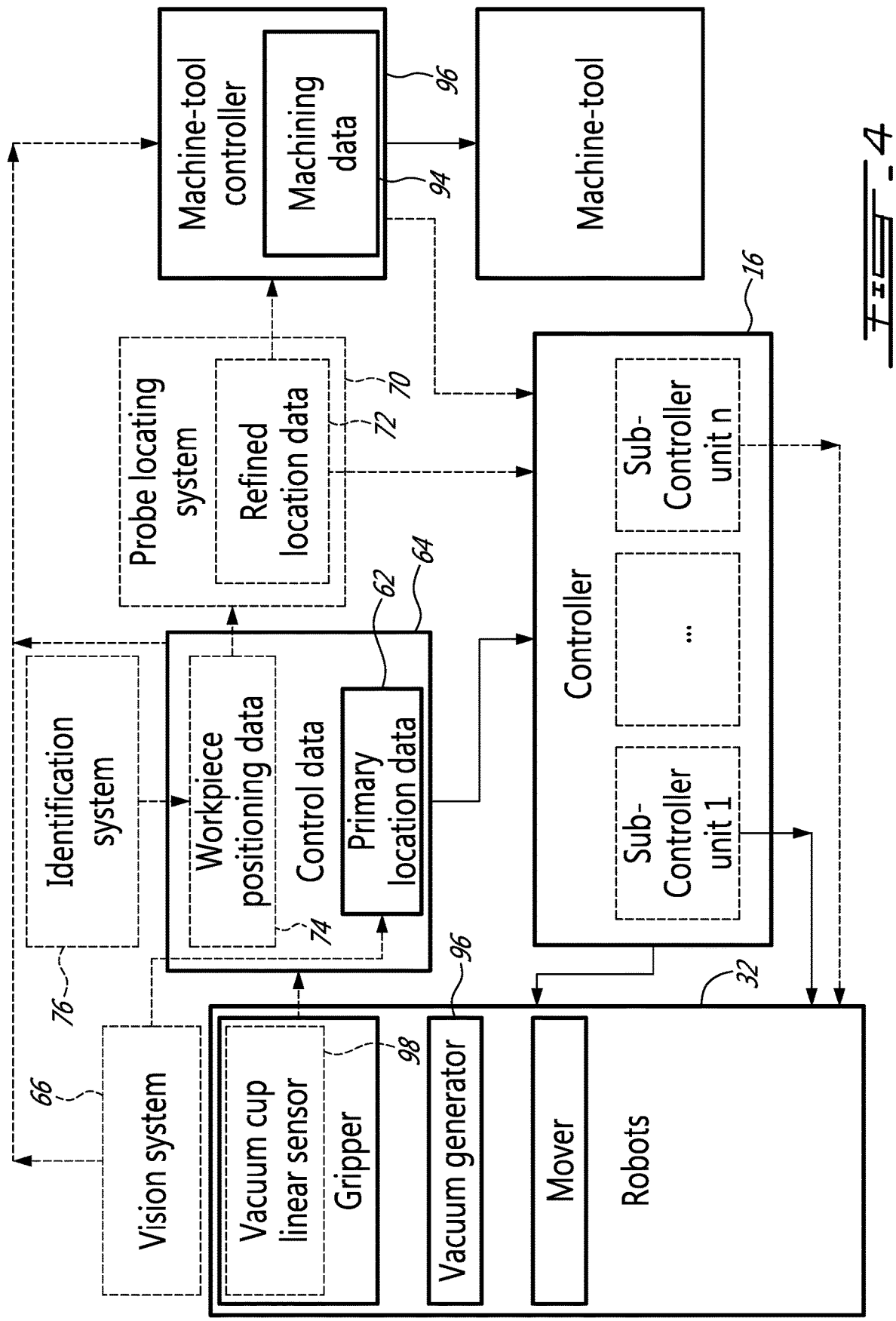
FIG. 4 is a bloc diagram of an example machining station.

Reference can be made to the bloc diagram shown in FIG. 4 to assist in the comprehension of the interactions between the various components, often computerized instances, at work in this embodiment. For instance, in some embodiments, it can be required, when the spindle of the CNC machine-tool system 12 reaches a given area of the workpiece 34, to free a specific one of the robots engaged with that given area from the workpiece 34, and move the robot out from interference with the tool path, for instance. The robot can be disengaged from a given area on the workpiece, moved away from that area, and then be re-engaged with that area once the interfering machining operation has ended. In an alternate embodiment, the robot can be disengaged from a first area, moved to a second area, and be engaged with the second area while a potentially interfering machining operation is conducted in the vicinity of the first area.

In a scenario where the machine tool controller 96 and the workpiece holding system controller 16 are embodied as separate controllers, this requires communication between these controllers. To this end, the machining data 94 can be made available to the workpiece holding system controller 16, which can determine when a given robot must be disengaged and cleared from a tool path, when the robot can be safely re-engaged with the workpiece, and control the given robot accordingly, for instance. Alternately, the machine-tool controller and the workpiece holding system controller can be integrated as part of a single controller.

Figure 6:
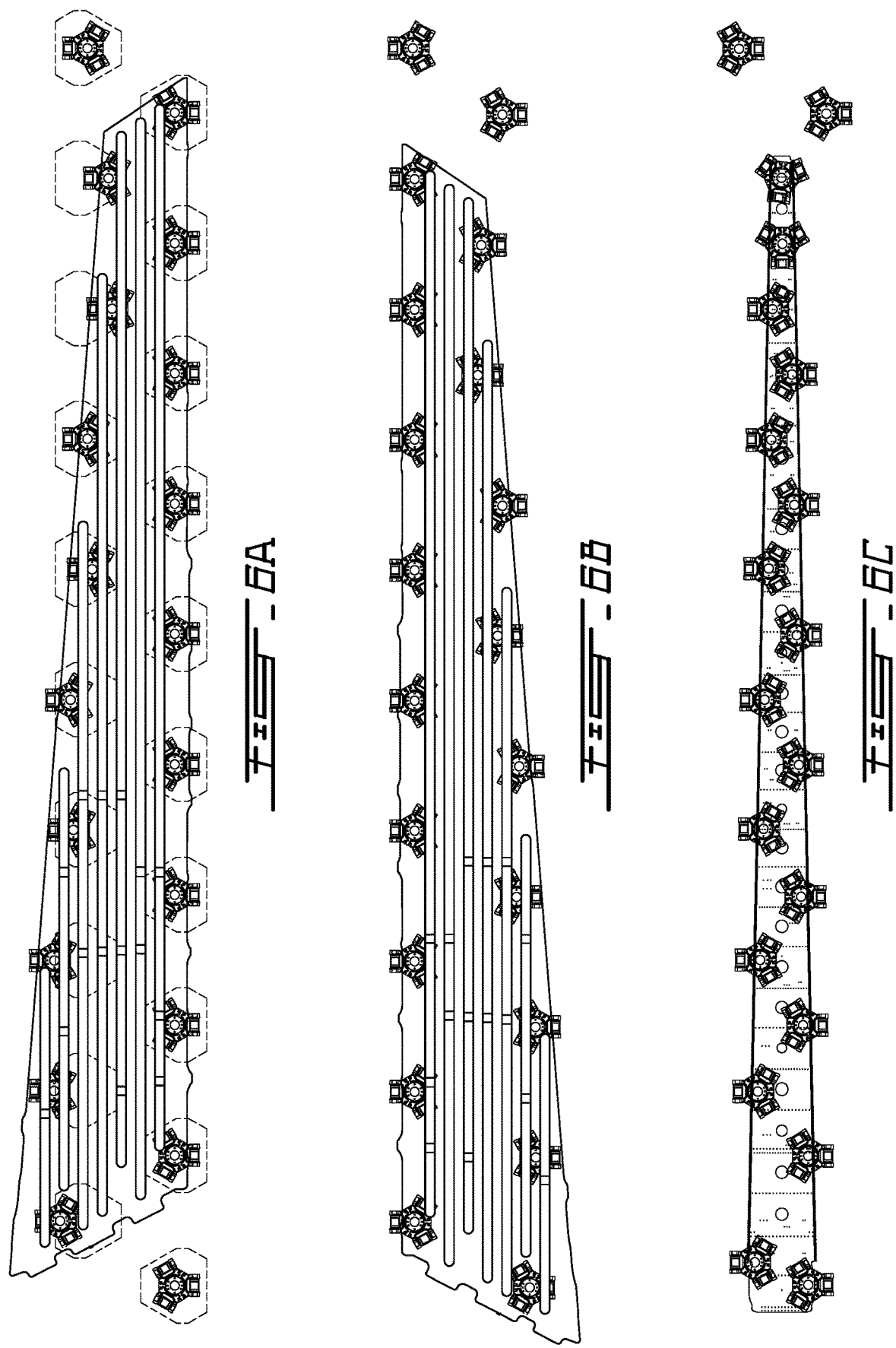
FIGS. 6A, 6B and 6C show different workpieces held in the machining station.

FIGS. 6A, 6B and 6C are views illustrating the flexibility of the workpiece holding system. Indeed, in this specific embodiment, the workpiece holding system has 24 robots, 12 on each respective side, all interspaced from one another on the table, and the mobility of the grippers afforded by the movers allows to grab various components. Indeed, in FIG. 6A, the robots are operated to grab a left wing skin, whereas in FIG. 6B, the same set of robots is used to grab a right wing skin. In FIG. 6C, the same set of robots is used to grab a spar.

Figure 9:
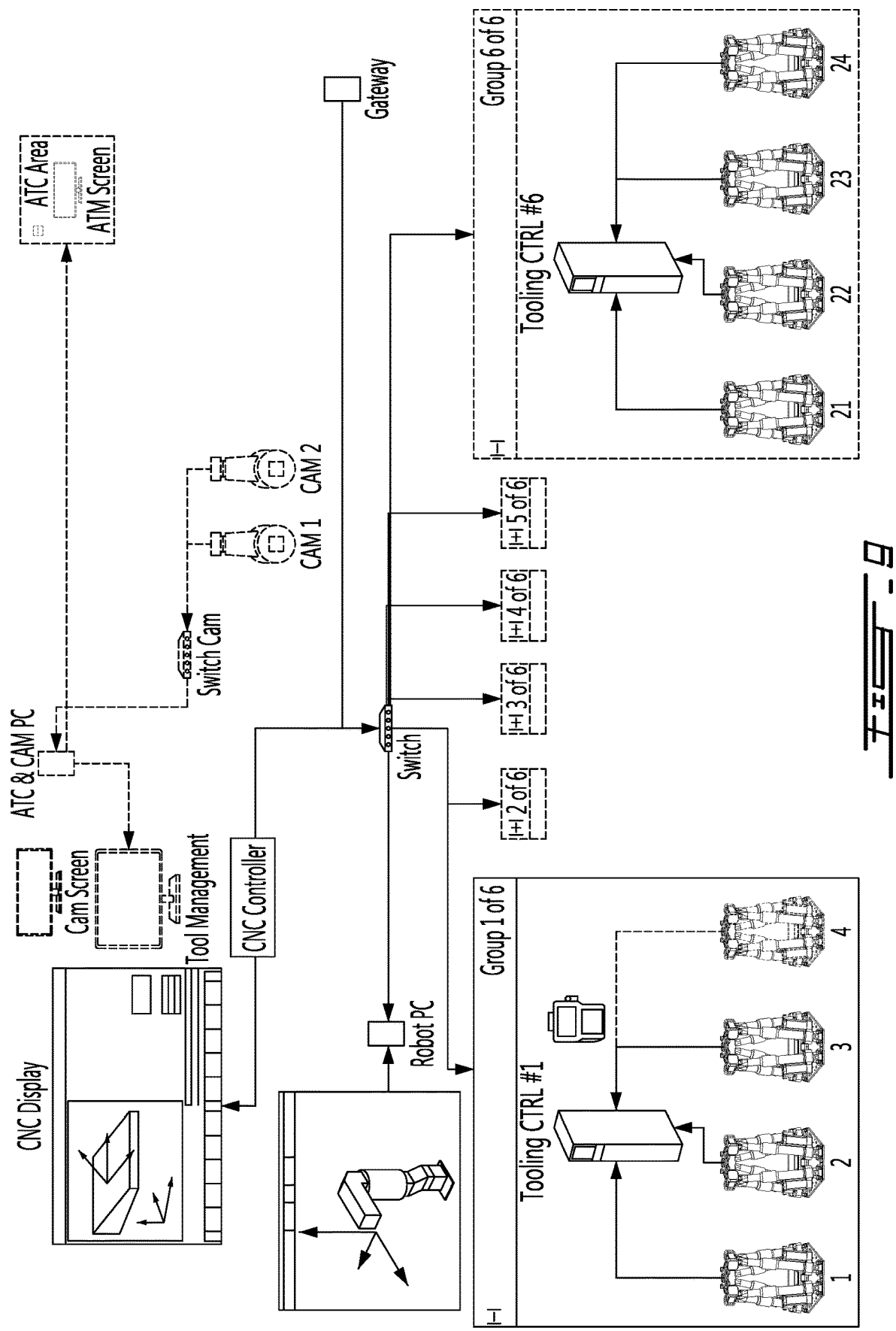
FIG. 9 is a bloc diagram of the example machining station of FIG. 1.

Indeed, in most embodiments considered, there will be significantly more than three robots which require movement in a coordinated manner. Particular challenges can arise in controlling the cooperating action of numerous robots. Indeed, it was found that sub-controller units (e.g. processors) could be used to control the cooperating action of robots of a given robot group such as shown in FIG. 4. However, robot groups were typically limited to four robots such as shown in FIG. 9, managing the cooperating action of multiple sub-controller units and thus multiple robot groups can be performed by application software provided by the robot manufacturer. Indeed, various embodiments of the workpiece holding system will include more than 5 robots, preferably more than 10 robots, more preferably more than 15 robots, and can require coordination between 2 sub-controller units, between 3 sub-controller units, or between more than 3 sub-controller units.

In this specific embodiment, 4 to 6 of the robots are equipped with 3D scanners as part of the vision system. These robots can grab the workpiece and move the workpiece close to the predetermined machining position. The remaining robots can then join the support effort, after which the probing routine can be used to do the final coordinate system adjustments. It will be understood that in alternate embodiments, the vision system can be based on one or more 2D cameras instead of 3D scanner. For instance, Fanuc™ provides a 2D vision system which can be found suitable in some embodiments, one of which will be presented in further detail below in relation with FIG. 9.

Figure 7:
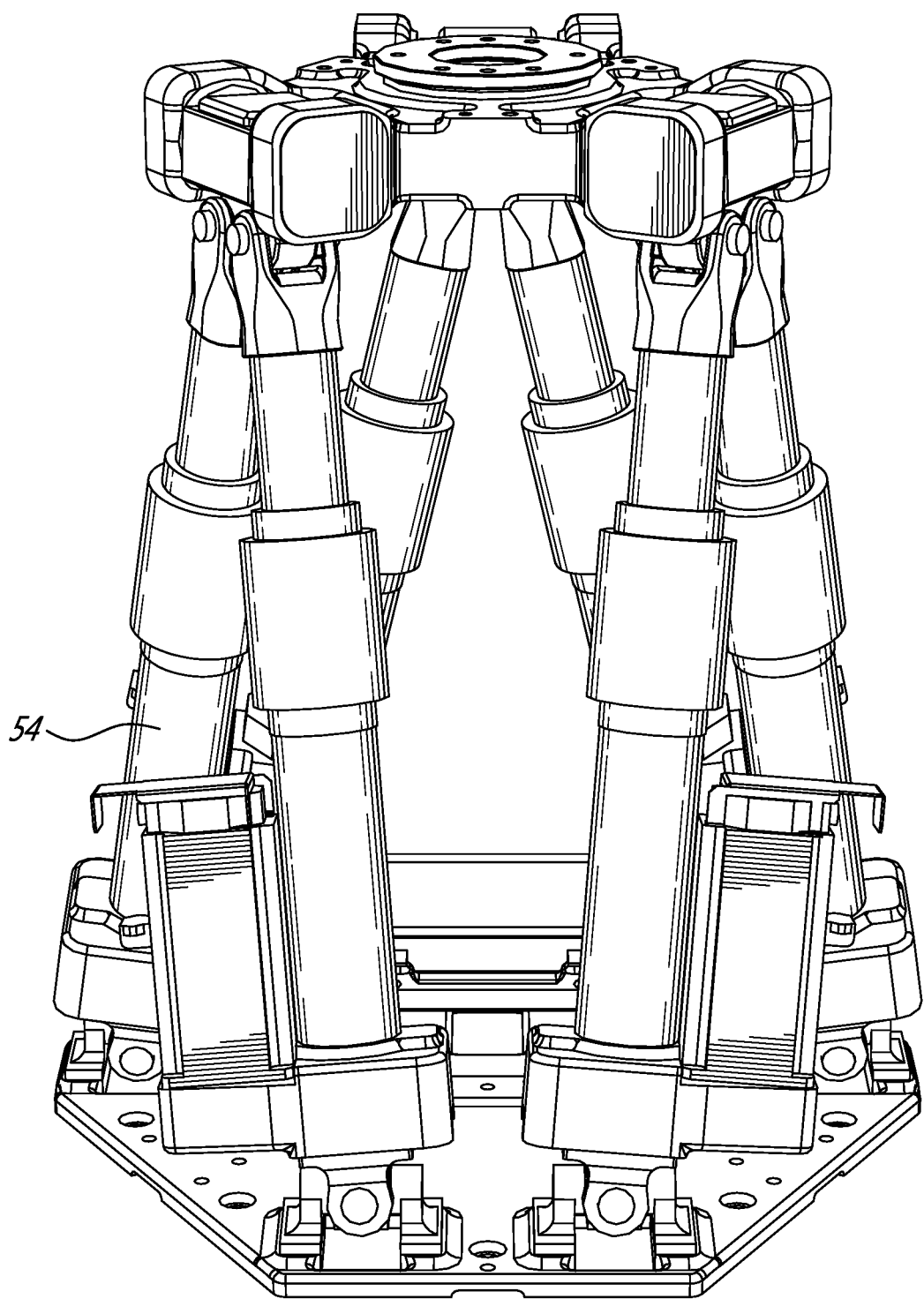
FIG. 7 is an oblique view of a multi-axis mover.

FIG. 7 shows an example of a multi-axis mover 54. In this example, the multi-axis mover is a hexapod and includes 6 extensible members each having a first end pivotally connected to the base and a second end pivotally connected to the gripper portion, in a configuration allowing both tilting and displacement of the gripper along three orthogonal axes, providing the gripper with six degrees of freedom. Indeed, each one of the 6 extensible members is independently operable by the controller 16. In this specific embodiment, the multi-axis movers are parallel kinematic robots of the hexapod type which can be obtained from a specialized manufacturer such as Fanuc for instance, and were found to provide satisfactory operability. Indeed, the parallel kinematic of the parallel kinematic robots of the hexapod type can provide satisfactory rigidity and repeatability, while allowing orienting the end effector with some degree of rotation around all three axes. Other suitable movers can be used in alternate embodiments FIG. 8A shows an example of a gripper 56 which can be used as an end effectors of the robots 32 illustrated in FIGS. 3A and 3B. In this embodiment, the gripper is of the astrictive type and includes a vacuum cup securable to a flat portion of the workpiece. More specifically, the lip of the vacuum cup can form a sealed compartment against the workpiece when engaged therewith, and a vacuum system which can have one or more vacuum generators 96 is used to reduce the air pressure within the sealed compartment and thus generate a vacuum force holding the workpiece against the gripper. Depending on the embodiment, the number of robots per vacuum generator can vary. In this embodiment, it was found satisfactory to provide one or more vacuum generators which each service a plurality of grippers, but each gripper was provided with a valve allowing to control the strength of the vacuum individually, on a per robot basis, forming part of an intelligent vacuum system.

In this specific embodiment, the vacuum cup is made of a flexible, resilient material, and the relative distance between the robot and the workpiece held by the robot can vary based on this flexibility and operating conditions. Such variations in the relative distance between a given robot and the workpiece it holds was a source of positioning uncertainty in the reference frame of the robots. Accordingly, a linear sensor 98 was provided with each one of the grippers to obtain a precise measurement of the exact distance between the face of the part and the robot, in the orientation of the axis of the linear sensor. As shown in FIG. 4, the reading of the linear sensors 98 was provided to the controller in the form of control data. Accordingly, using this data, the controller may be operated to move the workpiece more precisely to the predetermined milling position, for instance, or relative coordinates between the robots and the actual position of the workpiece can be otherwise corrected or compensated. More specifically, in this embodiment, the step of positioning the workpiece in the machining position can include determining any change in the linear sensor readings between the initial position and the milling position, and moving the grippers to correct any such change. Alternately, grippers can be moved to correct any change in the linear sensor readings which could occur due to stresses imparted to the workpiece during the machining operation, in real time, for instance. This gripper type was found to provide satisfactory gripping capability in the embodiment shown in FIG. 1, but it will be understood that other gripper types can be used in other embodiments. Moreover, more than one gripper, possibly of different gripper types, can be used as the end effector per robot if desired. For instance, a clamp gripper can be used in addition to a vacuum cup for a given robot, or for all robots, for instance. The gripper type or types can vary from one robot to another within a given workpiece holding system embodiment.

Indeed, the exact type of gripper can be selected from the following general categories: impactive—e.g. jaws, clamps or claws which physically grasp by direct impact upon the object; ingressive—pins, needles or hackles which physically penetrate the surface of the object (e.g. an aperture or bore of the workpiece); astrictive—forces applied to the objects surface (e.g. by vacuum, magneto- or electroadhesion); and contigutive—requiring direct contact for adhesion to take place (e.g. surface tension or freezing).

Additional detail will now be provided with respect to a specific implementation, with reference to FIG. 9. The workpiece holding system controller 16 can be provided together with HMI software. The functionality can be implemented using the robot controller integrated feature from the robot manufacturer that includes vision, guidance software, vision calibration grids, camera software. In this embodiment, the vision system performs a 2D scan. For instance Fanuc can provide a kit that includes: iRVision GigE 2D Guidance including iRVision-0010 G, iRVision 2D Guidance Software RTL-R685, vision label set VO-1800-560, vision calibration grids VO-1800-023, R-30iB iRVision eDoc CD MCROBIRVN06121E, iRVision GigE Camera Software Option RTL-R697, GigE Standard Resolution Camera Bundle GIGESTD_CAM_BDL, and Edmund Optics 12 MM High Res Lens #NT58-001Hi-Res LENSO000000030O. An oval shaped vacuum cup can be used to achieve a satisfactory holding force. The oval shape can provide large surface but can still be set in relatively narrow areas. Combined with the ability of the robot to orient the cup normal to the part surface and with its length in a given orientation, such oval vacuum cups can results into an agile tooling. The vacuum cups can be mounted on the robot flange using an extension to reach the workpiece while on the trolleys and to be able to lift it from the trolley without collision of the robot head with the trolleys frame. The vacuum cup can be equipped with a Z-axis distance sensor in the form of a linear scale based touch sensor such as made available from a specialized sensor manufacturer. This has been used with good results. Based on the reading of each sensor, the robots can be repositioned to bring the workpiece closer to the predetermined (theoretical) milling position, for instance. The operation can be performed in the following sequence: i) Secure a just drilled workpiece on the trolley; ii) pull the trolley out of the machine; iii) undo clamping (can be done while previous workpiece is being machined); iv) Push trolley into position on the machine; v) Vision system gets targets and 4 robots pick-up the part; vi) Workpiece is moved to theoretical/predetermined milling position +/−0.125"; vii) The rest of the robots move to theoretical/predetermined milling position and grab the part; viii) Z-Axis position is adjusted based on sensor reading; ix) Part finding probing routine adjusts the program frame. A tooling interface showing the fixture in a simulation mode can be used to enable the operator to clearly see the fixture status and what will be the next move in the set-up program. A manual mode can also be provided in which each robot can be individually selected, and manual moves can be previsualized in simulation mode and then applied. The motions can be controlled in the machine X-Y-Z coordinate system. The main controller can include a program runnable by a last generation PC. A Set-up program can be used to define the robotic tooling configuration. Commands can be imbedded in the workpiece-cutting program and can activate the different functions of the robots. There can also be commands to validate the set-up vs. the workpiece program, and the workpiece origin. Forced commands can also be provided. Manual mode can be used to send commands entered manually to the actuator. The manual mode can be used by the operator and the maintenance personnel. Such commands can be executed either from the main HMI or using a Teach-pendant available from the robot manufacturer, and can includes moving the end effector in X-Y-Z, or tilting around X-Y-Z. Automatic commands can be used to send commands to the robots from the set-up program. The set-up program and the drilling program can be selected automatically based on a bar-code reading of the work-order or from a production management screen for instance, to ensure coordination of the drilling and fixture program. The set-up program may be sequenced so that the part can be lifted first, then positioned, and then conformed to theoretical milling position in steps. Commands for positioning, sensor reading and vacuum control can be provided. CNC command mode can be used to send such commands from the drilling program in case that during the drilling process a vacuum cup need to be retracted or repositioned. To facilitate set-up and maintenance, a Hand-Held Teach pendant can be supplied. This pendant can be connected to any of the six robot controller to move manually any of the 24 robots. An individual compact vacuum generator unit can be installed on each actuator close to the suction pads. The vacuum cups can have dimensions of 55 mm×150 mm (2"×5.9") and a holding force of 125 lbf @ 27 in Hg, for example. The units can use compressed air to generate vacuum air supply, and have the following features for instance: vacuum level=0.9 bar; pressurized air; integrated analog vacuum sensor; vacuum level adjustable at each actuator from operator station; low air consumption—for 24 actuators; continuous=0.8 m3/hr @ 5 bar; intermittent ~2 to 3 minutes=2.64 m3/hr @ 5 bar; check valves and intelligent control to maintain vacuum. A through-type silencer can be favored to reduce likelihood of clogging. Analog vacuum monitoring can be provided. The flexible adjustable vacuum system can allows the end user to set the proper level of vacuum to a specific actuator or specific zone. The proposed vacuum system can be adjustable and easily settable with a software interface. Vacuum analog sensors can be used monitor the vacuum level applied to the part. In the software, each vacuum level value will be visible as soon as the mouse cursor is pointed over the relevant actuator in the monitoring display. The software can provide for vacuum alarm signal to be easily visible by a specific color and also by the display of a message on the main operator screen. Anything in between can be illustrated as a warning zone shown by the color yellow on the monitoring display. A programming and simulation package can be provided, which can include the following features, for instance: ICAM software to create a CATIA Template; CATprocess to include the index elements and options to position the workpiece on machine using 2 indexes; CATIA NC programmer can use this template to indicate the workpiece indexing and support frame of the workpiece and then create points where he desires to have the hexapod to touch the workpiece; ICAM Extractor can take the information and sends it to ICAM Virtual Machine environment; ICAM Virtual Machine can show the part in position on machine; ICAM Virtual Machine can calculate the position of the different Hexapod heads and display only the Hexapod head (not the arm articulation below—not needed in the case of hexapods in this configuration because no possible collisions); in case of collision ICAM Virtual Machine can show the collision of the vacuum heads; ICAM offers the possibility to the user to indicate a new position of the Hexapod head entering a DeltaX and DeltaY value (ICAM to recalculate appropriate Head position relatively to surface normal; ICAM Post/Simulation can generates two files including i) one with point and vector position of each Hexapod to be positioned at and ii) one with the G code drilling program; and a special VM application with dialog boxes, user interface and documentation. ICAM can create: i) The related PP/VM/MRS (Post machine model integration, indexes and template tests, & Simulation as well as dialog boxes, user interface, documentation); ii) Delivers the CATIA related CATProcess template; iii) Post-processor and UHF related documentation. The ICAM solution can: i) Allow the user to reposition the Hexapod support without going back to CATIA CatProcess to do it; ii) provided a history file generated from user decision from ICAM Virtual Machine session are kept to ensure we can repost the same job in same condition—providing exact same output. The controller can include one main HMI PC and 6 robot sub-controller units. In alternate embodiments, another vision system can be used. For instance, a vision system provided by Cognex or by Sick can be used, or a generic camera system with an open architecture can be used, for instance. It can be advantageous to integrate the vision system to the controller in the context of functions such as re-calculation of gripper paths/coordinates, for instance.

As can be understood, the examples described above and illustrated are intended to be exemplary only. The scope is indicated by the appended claims.

What is claimed is:

1. A machining station comprising:
   a table;
   at least three robots, each robot having a multi-axis mover secured to the table, and a gripper opposite the table, the robots being interspaced from one another on the table, each robot having parallel kinematic extensible members each having a first end pivotally connected to a base and a second end pivotally connected to a corresponding gripper portion; each robot configured to allow both tilting and displacement of the gripper;
   a controller configured and adapted to independently control each one of the robots to automatically engage a corresponding location of a workpiece, hold the workpiece in a coordinated manner, and release the workpiece, based on control data, the controller configured and adapted to independently and collectively operate each one of the parallel kinematic extensible members of each robot and control movement of the respective gripper and orientation of the respective gripper;
   a computer numerical command (CNC) machine-tool system operable to machine the workpiece while the workpiece is held by the plurality of robots.

2. The machining station of claim 1 wherein the table has an elongated cavity forming a trolley path, the trolley path being adapted to receive a portion of the trolley in longitudinal sliding engagement with the table, wherein the workpiece can be secured to the trolley to move the workpiece into and out from the machining table with the trolley.

3. The machining station of claim 2 wherein the elongated cavity has an inverted T shape cross-section, with a lower channel adapted to receive a wheeled base of the trolley, and a central slot adapted to receive a vertical member of the trolley, the vertical member of the trolley leading to an upper frame adapted to receive the workpiece secured thereon.

4. The machining station of claim 3 wherein the vertical member of said trolley has rollers on opposite sides, said rollers being matingly configured in a manner to engage corresponding opposite faces of said slot.

5. The machining station of claim 3 provided in combination with a plurality of said trolleys.

6. The machining station of claim 3 comprising at least four robots on each side of said slot, further comprising an alley on each side of the slot alongside the corresponding robots, opposite the slot.

7. The machining station of claim 1 comprising at least 5 of said robots, wherein the controller includes at least two sub-controllers, each of said sub-controllers controlling the operation of a sub-group of said robots.

8. The machining station of claim 1 wherein said controller is configured and adapted to control said robots based on control data, said control data including primary location data indicative of the position and orientation of the workpiece in the machining station.

9. The machining station of claim 8 further comprising a vision system adapted to perform a scan including at least partial coordinates of the workpiece in the machining station, configured and adapted to provide said at least partial coordinates in the form of said primary location data.

10. The machining station of claim 8 wherein said control data further comprises predetermined milling coordinates indicative of a predetermined milling position and orientation for said workpiece, said controller being configured and adapted to move said workpiece from said primary position and orientation to said predetermined milling position and orientation based on said primary location data and on said predetermined milling coordinates; wherein said predetermined milling position and orientation is above a height of the trolley to avoid interference between the CNC machine tool and the trolley.

11. The machining station of claim 8 further comprising a probe locating system adapted to provide refined location data indicative of the location of the workpiece, and being operable based on the primary location data, the CNC machine tool system being operable to machine the workpiece based on the refined location data.

12. The machining station of claim 1 wherein the multi-axis mover is a parallel kinematic mover and includes 6 of the parallel kinematic extensible members operable by the controller, wherein the tilting and displacement of the gripper is provided along three orthogonal axes, providing the gripper with six degrees of freedom.

13. The machining station of claim 1 wherein the gripper includes a vacuum cup securable to a flat portion of the workpiece by suction thereagainst.

14. The machining station of claim 13 wherein the gripper further includes a length gauge having a measurement axis oriented normal to a plane of the vacuum cup.

15. The machining station of claim 14 wherein said controller is configured and adapted to adjust the position of the grippers based on a measurement received from the length gauges.

16. The machining station of claim 1 wherein the controller is further operable to control the selective disengagement and re-engagement of an individual one of said robots upon determination that a tool path of said CNC machine system interferes with the position of the individual one of said robots when the individual one of said robots is engaged, said disengagement and re-engagement being coordinated with the execution of the tool path.

17. The machining station of claim 16 wherein said disengagement and re-engagement includes removing the individual one of said robots from a first area on the workpiece and then engaging the individual one of said robots with another area of the workpiece.

18. The machining station of claim 1 further comprising an identification subsystem configured and adapted to receive an input, and obtain data concerning the workpiece based on said input.

19. The machining station of claim 18 wherein said data concerning the workpiece includes predetermined milling coordinates of said workpiece.

20. A method of machining a workpiece in a machining station having a table, at least three robots, each robot having a multi-axis mover secured to the table and having a gripper opposite the table, and a computer numerical command (CNC) machine-tool, each robot having parallel kinematic extensible members each having a first end pivotally connected to a base and a second end pivotally connected to a corresponding gripper portion in a configuration allowing both tilting and displacement of the gripper, the method comprising, positioning the workpiece in the machining station;

controlling each one of the robots to automatically engage a corresponding location of the workpiece, hold the workpiece in a coordinated manner, and release the workpiece, including controlling each one of the parallel kinematic extensible members of each robot independently from one another and collectively along different paths and control movement of the respective gripper and orientation of the respective gripper, based on control data, said control data including coordinates of the workpiece in the machining station;

machining the workpiece with the CNC machine-tool while the workpiece is held by the robots;

controlling the robots to free the workpiece;

removing the workpiece from the machining station.

* * * * *